United States Patent [19]

Galland

[11] Patent Number: 5,401,360

[45] Date of Patent: Mar. 28, 1995

[54] METHOD FOR DE-INKING PRINTED PAPER

[75] Inventor: Gérard Galland, Grenoble, France

[73] Assignee: Centre Technique de l'Industrie des Papiers, Cartons et Celluloses, France

[21] Appl. No.: 942,324

[22] Filed: Sep. 9, 1992

Related U.S. Application Data

[63] Continuation of Ser. No. 725,285, Jul. 3, 1991, abandoned.

[30] Foreign Application Priority Data

Jul. 12, 1990 [FR] France .............. 90 09128

[51] Int. Cl.⁶ .............. D21B 1/32
[52] U.S. Cl. .............. 162/8; 162/4
[58] Field of Search .............. 162/4, 8, 5

[56] References Cited

U.S. PATENT DOCUMENTS

| | | | |
|---|---|---|---|
| 4,162,186 | 7/1979 | Wood | 162/5 |
| 4,264,412 | 4/1981 | Hasler et al. | 162/5 |
| 4,332,638 | 6/1982 | Mauer et al. | 162/5 |
| 4,356,058 | 10/1982 | Fischer et al. | 162/5 |
| 4,360,402 | 11/1982 | Ortner et al. | 162/5 |
| 4,450,043 | 5/1984 | Scholr | 162/5 |
| 4,548,674 | 10/1985 | Haqemen et al. | 160/5 |
| 4,780,179 | 10/1988 | Clement | 162/7 |
| 4,865,690 | 9/1989 | Bernard | 162/4 |
| 4,959,123 | 9/1990 | Lehmann et al. | 162/8 |
| 5,225,046 | 7/1993 | Borchardt | 162/5 |

FOREIGN PATENT DOCUMENTS

| | | | |
|---|---|---|---|
| 699582 | 12/1964 | Canada | 162/5 |
| 0116145 | 12/1983 | European Pat. Off. . | |
| 0133559 | 8/1984 | European Pat. Off. . | |
| 2901942 | 8/1977 | Germany | 162/7 |
| 51-36362 | 8/1976 | Japan | 162/7 |
| 1012527 | 12/1965 | United Kingdom | 162/7 |

OTHER PUBLICATIONS

Tappi Journal-vol. 69, No. 3, Mar. 1986, pp. 102–106, Quick and Hodgson.
Abstract Bulletin of the Institute of Paper Chemistry, vol. 58, No. 3 (1987) p. 372, L. Marchildon et al.
Papers presented at EUCEPA Symposium (1989) by Linck, et al.
Papers presented at EUCEPA Symposium (1989) by Ortner and Fischer.
Papers Presented at PIRA Conference by Putz, et al. (1989).
Papers presented at PTS Symposium in Munich by Putz et al. (1990).
Summary of "Two Stage, Alkaline-Acidic Flotation . . ." by Suss et al. Jahrgang (1991).
Papers presented at PTS Deinking Symposium by Jarrehult et al., (1990).

*Primary Examiner*—W. Gary Jones
*Assistant Examiner*—Brenda Lamb
*Attorney, Agent, or Firm*—Harris Beach & Wilcox

[57] ABSTRACT

A two phase method for deinking printed waste paper having a mixture of printing inks is shown. The first phase is carried out in a neutral or slightly acid medium and the second phase in an alkaline medium. The first phase has disintegration, ink removal, and thickening steps. The second phase includes mixing and treating the thickened output from phase one with alkaline reagents, removal of any residual ink, and a second thickening. A third treatment of the removed ink and recycling of the media is also indicated.

16 Claims, 2 Drawing Sheets

METHOD FOR DE-INKING PRINTED PAPER

This is a continuation of application Ser. No. 07/725,285, filed on Jul. 3, 1991, now abandoned.

The invention relates to a method for recycling printed waste paper, irrespective of the method used to print it and the type of ink used, not subjected beforehand to any sorting.

BACKGROUND OF THE INVENTION

The recycling of printed waste paper corresponds to a rapidly developing industrial reality, and is consequently becoming a fairly widespread technique which there is therefore no need to describe in detail. In summary, the recycling consists in carrying out two essential operations, namely a first deinking operation and a second bleaching operation.

The first so-called "deinking" operation is an indispensable stage which is currently also well known. The second so-called "bleaching" operation only becomes necessary when it is desired to obtain recycled pulps of high quality, in other words with a high level of whiteness.

The deinking operation employs two main phases:
  the detaching of the ink from the fibrous support, carried out in a pulper simultaneously with the suspension of the waste paper, generally with the addition of one or more chemical reagents;
  then, the removal of this ink, after it has been detached, from this pulpy suspension, which removal is carried out, for example, by flotation or by washing.

Indeed, the detaching of the ink from the fibrous support is traditionally carried out in an alkaline medium. Sodium hydroxide, which is generally used, has a twofold beneficial effect. On the one hand, it causes the cellulose fibre to swell and, on the other hand, it attacks the binders of the inks to the fibrous support.

For some years, a continually growing development of newspapers printed using the flexographic printing method has been observed, in particular due to the numerous advantages which it offers as compared with the traditional printing methods.

Nevertheless, paper printed using the flexographic method has the serious disadvantage of being difficult to deink, and hence difficult to recycle, using the traditional deinking methods. Indeed, the binder for flexographic inks consists of acid acrylic resins saponified by an amine. If the paper printed in this way is treated with an alkaline medium, the binder dissolves, causing virtually the isolation of the pigment. Since the latter is very fine and, furthermore, does not have a hydrophobic nature, it does not float and offers a larger specific surface area, consequently better absorbing the incident light, and hence affecting the residual whiteness of the pulp.

PRIORITY ART

In the traditional deinking methods, after detaching the ink, the latter is removed using one of the following two methods, namely flotation or washing. However, it should be noted that the increasing level of contamination of recycled paper has led to the proposing of increasingly complex treatment chains, comprising a plurality of stages of ink removal with a mechanical dispersion of the substance between the two flotation stages. It has, for example, been proposed to carry out these two flotation phases at different pH's, namely respectively a first phase in an alkaline medium and then a second phase in a medium with a lower pH, in other words less alkaline or neutral (see for example the papers presented at the EUCEPA Symposium at LJUBLJANA (October 1989) on the one hand by LINCK, MATZKE and SIEWERT, and on the other hand by ORTNER and FISHER). It has also been proposed to carry out a washing after the flotation and the bleaching (see for example document EP-A-0,284,526), these two flotation and washing treatment stages being carried out in an alkaline medium.

At the PIRA conference from Feb. 28 to Mar. 2, 1989, PUTZ, TOEROEK and SCHAFFRATH showed that, in the case of newspapers printed using the flexographic method with water-based inks, the reduction in the quantity of sodium hydroxide introduced, hence a reduction in the pH, made it possible to improve the whiteness. Nevertheless, the results obtained are not satisfactory and are not comparable with the traditional deinking method applied to paper printed using the offset or photogravure method.

At the April 1990 symposium on deinking organised by PTS in Munich, various papers, and in particular those of PUTZ, TOEROEK, GOETTSCHING, of HORNFECK, LIPHARD, and of JAERREHULT, LUNDKVIST, HANECKER, PHAM TRI, presented the results of work centered mainly on the use of new additives intended to flock and collect better flexographic printing inks. Although these results do show significant improvements in the final whiteness, these improvements are nevertheless limited as soon as it is desired to treat mixtures of offset and flexographic printing.

The document EP-A-0,116,145 discloses a method for deinking waste paper by removing the ink in two distinct and separate phases, with an intermediate thickening stage, these two phases being carried out in an alkaline medium (pH 9 and above). This method gives good results with paper printed using the photogravure or offset method, but cannot be used on paper printed using the flexographic method since, as already mentioned above, the fine particles of pigment are released, which disturbs the flotation stage and affects the whiteness of the pulp obtained.

SUMMARY OF THE INVENTION

The invention aims to overcome these disadvantages. It proposes a method for deinking printed paper with a view to its recycling, irrespective of the method used to print it, namely: offset, photogravure, flexographic, typography, etc., without prior sorting into the various categories of printing methods. In other words, the method which is the subject of the invention aims to treat mixed printed paper irrespective of its origin.

This method for deinking printed waste paper, in which:
  the said paper is converted into a pulpy suspension;
  the ink is then removed from this suspension in two distinct and successive phases I and II, followed by a thickening stage;
  lastly, the pulp deinked in this way is sent into the use circuit of the pulp, is characterised:
  in that the first phase I, during which the waste paper is disintegrated into a pulpy suspension, the ink is then removed initially and the partially deinked pulp is thickened, takes place in a neutral or acid medium;

and in that the second phase II, in which the pulp thus thickened is recovered, reagents are added and, lastly, the ink is removed for a second time and the pulp is thickened again, takes place in an alkaline medium.

In other words, the subject of the invention is an improvement to a method for deinking in two successive phases which consists in carrying out this treatment, respectively firstly in a neutral or acid medium and then in an alkaline medium.

It has been found, entirely unexpectedly, that the first deinking, carried out in a neutral or slightly acid medium, is beneficial for the second deinking stage, which is carried out in the traditional manner in an alkaline medium.

"Neutral medium" refers to a fibrous suspension of disintegrated waste paper, the pH of which has not been modified by the deliberate addition of chemical agents in order to give it an alkaline character. Depending upon the origins of the paper used, the pH of this suspension can be close to 7, and even slightly greater than 7 (for example 7.7 when the fillers and the binders give the suspension a very slightly alkaline character).

The treatment should preferably be carried out at a pH less than eight (8) and in all cases greater than four (4) in order not to damage the fibres.

BRIEF DESCRIPTION OF THE DRAWINGS

The way in which the invention can be implemented, and the advantages which result therefrom, will become more apparent from the exemplary embodiments which follow, taken together with the two attached figures.

DETAILED DESCRIPTION OF THE PREFERRED EMBODIMENT

Figure 1:
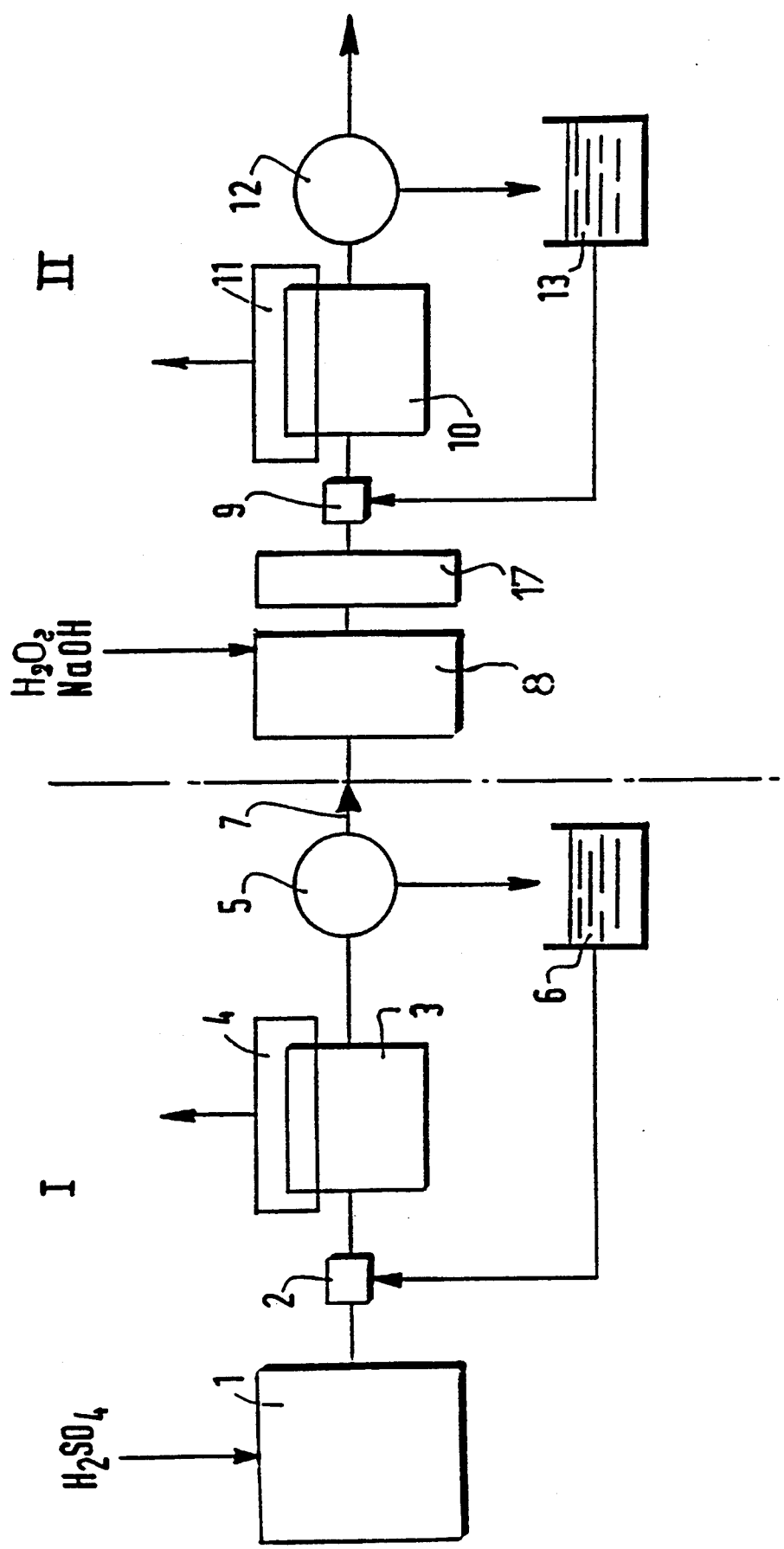
FIG. 1 is a diagrammatic representation of one of the embodiments of the method according to the invention.

As has been shown diagrammatically in FIG. 1, the method according to the invention consists in removing the ink from printed waste paper in two phases I and II, respectively neutral or slightly acid I, and then alkaline II.

During the first phase I, firstly the printed waste paper is converted into an aqueous suspension by disintegration in a pulper (1), and this takes place in an acid medium at a temperature lying between 20° and 60° C. The acid medium is obtained, for example, by adding sulphuric acid $H_2SO_4$ or by bubbling carbon dioxide into the solution. Surfactants and/or anti-redeposition agents such as carboxymethylcelluloses are advantageously added into the pulper, in a known manner, for the purpose of promoting the detachment of the ink and the subsequent flotation.

In an alternative, still in this first phase, it is possible to add a reducing bleaching agent, active in an acid medium, of the sodium hydrosulphite type, and to store the reaction mixture thus formed for a period which can vary from half an hour to one hour, with a view to permitting an effective action of these various agents.

Simultaneously, it is also possible to add to the solution contained in the pulper (1) complexing agents for heavy metal ions, of the DTPA type (diethylenetriaminopentacetic acid or its sodium salt) or derivatives of phosphonic acid, in order to complex the metal ions, capable of promoting the action of the reducing bleaching agent, and the subsequent action of a bleaching agent which may be incorporated during the second phase II in an alkaline medium.

The pH of the solution of the first phase I is typically situated between 4.5 and 8.

This detaching of the ink is then followed by a dilution (2), and then by removal (3) of the ink by selective flotation, the separated ink being concentrated in the form of a froth (4).

The pulp partially deinked in this way is thickened at (5), the water (6) resulting from this thickening being recycled and reintroduced into the circuit at the point of the dilution (2).

The essential object of this first phase I is to detach and to remove the ink from the paper printed with water-based inks.

On the other hand, the second phase II which will be described below concerns the total removal of the ink from all the paper to be recycled, and more specifically the removal of the ink from the paper printed using more traditional methods, offset, photogravure, typography.

As already mentioned, the first deinking in an acid medium is beneficial for the second deinking in an alkaline medium of the paper printed using the above methods. In other words, the first phase I, which is neutral or even slightly acid, interreacts with the second phase II, which is alkaline, in order to permit the simultaneous removal of the particles of flexographic ink and of the particles of conventional ink (offset, typographic, photogravure), something which was impossible hitherto.

The partially deinked pulp (7) obtained after thickening at (5), at a concentration of approximately 15%, the said thickening being effected, for example, by filtration, is treated in a mixer (8) into which are introduced alkaline reagents, typically sodium hydroxide supplemented with hydrogen peroxide $H_2O_2$ as a bleaching agent, in a proportion of 1 to 2% by weight of dry pulp, and to which is added, in the traditional manner, sodium silicate, in a proportion of 2 to 3% by weight of dry pulp, and a complexing agent (DTPA). Although this novel treatment can be carried out at room temperature, it has, however, been noted that by raising the temperature to about 55° to 60° C., the effectiveness was improved. Furthermore, in order to promote the action of the bleaching agent, the reaction mixture is stored for approximately one hour in a storage tower (17). This storage can nevertheless vary from half an hour to three hours. This treatment in an alkaline medium causes the ink to become detached from the paper printed using the offset, photogravure or typographic method. Collector agents are then added, of the type comprising fatty acids, soaps of fatty acids or derived products, currently used for deinking and intended to accentuate the hydrophobic character of the ink thus detached, and to promote its subsequent removal by flotation.

Once this operation has been performed, the pulp is diluted (9) and then is subjected to another selective flotation (10) during which the residual inks detached at (8) are removed in the form of a froth (11).

In an alternative, the ink detached during the second stage (8) can be removed by washing and the water resulting from this washing is recycled after flotation, as described in the document EP-A-0,284,526. This patent corresponds to U.S. Pat. No. 4,865,690, which is herein incorporated by reference.

The pulp thus deinked is subjected to a second thickening (12) before being introduced into the use circuit of the pulp. The white water (13) resulting from this thickening is, in the conventional manner, recycled and used during the dilution (9).

The pulps resulting from the thickening (12) may be subjected to an additional bleaching before being introduced into the use circuit of the pulp.

Figure 2:
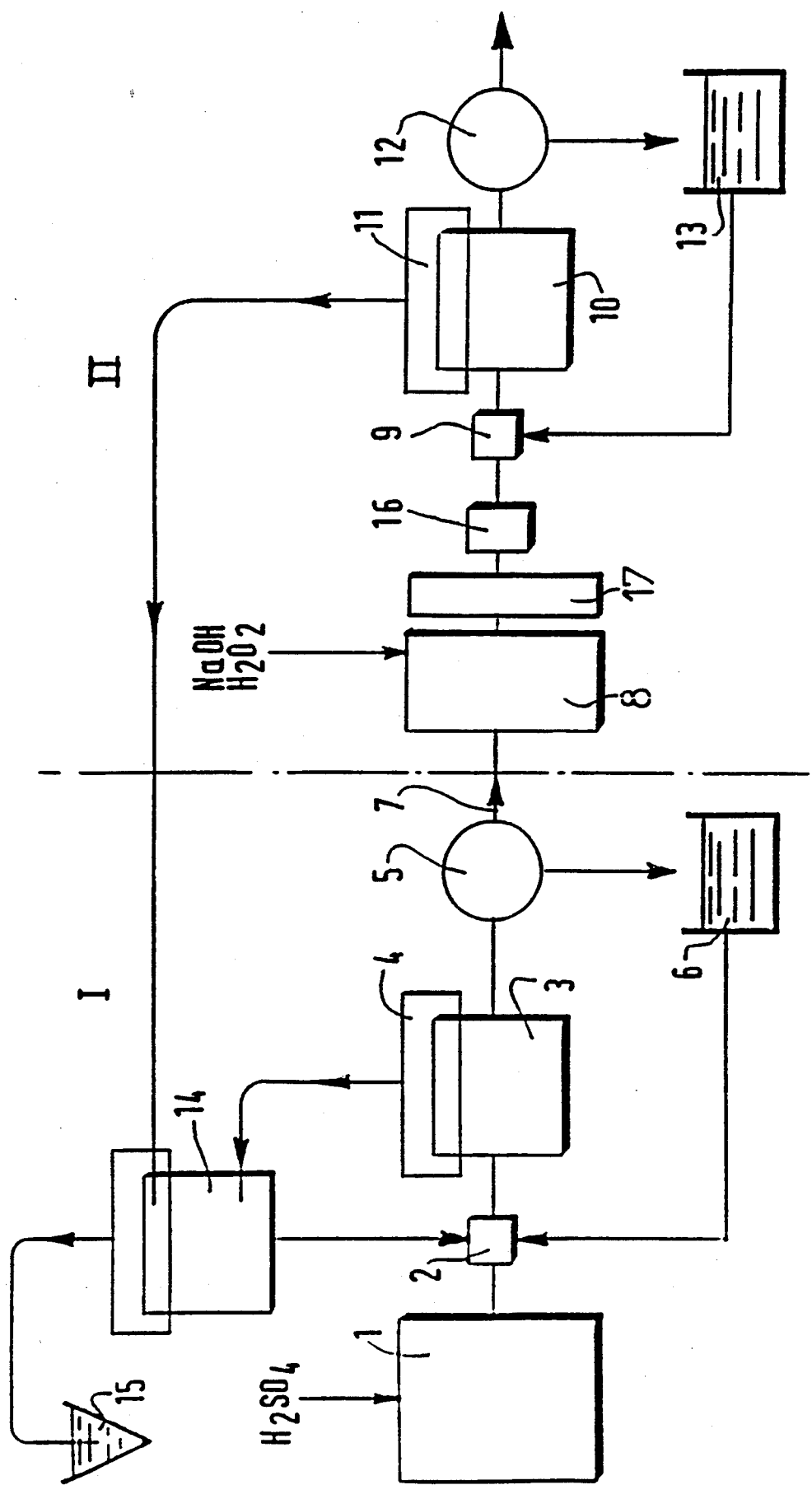
FIG. 2 is a diagrammatic representation of another embodiment of the method according to the invention.

In another advantageous embodiment shown diagrammatically in FIG. 2, the froths (4) and (11) resulting from the selective flotation of the pulp are treated. The froths (11) are subjected to a prior acidification in order to bring them to the same pH as the froths (4). They are subsequently mixed and then subjected to another selective flotation (14), the froths resulting from this second flotation being finally discharged (15), and the substance thus recovered being recycled at the point of the dilution (2) of the deinking phase I.

The phase II can also be supplemented by a mechanical treatment (16) following the storage in the tower (17), which is intended to promote the detaching of the ink from the paper printed using the offset method, at a concentration preferably not more than 20%.

Furthermore, the installation can be supplemented by a line for traditional disintegration and detachment in an alkaline medium, which line is mounted in parallel with the treatment line described and is intended to treat paper printed using the offset, photogravure and typographic methods and not containing any paper printed using water-based inks. Thus, this paper can be introduced directly, either at the outlet from the mixer (8), and can be subjected to the treatment described in phase II, or after dilution (9) and before flotation (10).

The following examples illustrate the results obtained, on the one hand, using the traditional methods and, on the other hand, using the method according to the invention.

EXAMPLE 1

A mixture of waste paper printed using the offset, photogravure and flexographic printing methods is treated in a known manner. This paper is converted into a pulpy suspension of 15% concentration by means of a traditional pulper in an alkaline medium, typically containing, by weight of dry substance, 1% of sodium hydroxide, 2% of sodium silicate, 1% of hydrogen peroxide and 0.8% of soap. The temperature of the mixture is maintained at 45° C.

The alkaline pulpy suspension is then diluted, and subjected to a selective flotation. It has been noted that, depending upon the type of paper used, whitenesses (measured in accordance with the standard AFNOR Q03-039) are obtained which are, respectively:

58 for an offset newspaper,
62 for a mixture of offset newspaper/magazine,
28 for flexographic newspapers, and
40 for a mixture of half flexographic and half offset newspapers.

EXAMPLE 2

A mixture of newspapers, 50% printed using the offset method and 50% using the flexographic method (with water-based inks) is used.

This mixture is converted into a pulpy suspension of pH 5 in a medium acidified with sulphuric acid. A surfactant of the BEROCELL 213 type (EKA trademark) is then introduced. The temperature of the treatment is 45° C. The mixture thus formed is then diluted, and this diluted mixture is subjected to a flotation in an acid medium (pH=5). The whiteness obtained is 45.

EXAMPLE 3

Example 2 is repeated with an acid treatment at a pH lying between 5 and 6. The pulp is thickened to an 18% concentration and then a liquor is introduced containing sodium hydroxide (1%), sodium silicate (2.5%), a complexing agent (DTPA) (0.3%) and hydrogen peroxide (1%). The quantities given correspond to percentages by weight of dry pulp. A whiteness of 50 is obtained.

After dilution, 1% by weight of dry substance of soap is added, and then a second selective flotation in an alkaline medium (pH close to 9) is carried out, according to the method in accordance with the invention. The final whiteness obtained is 57.

This example in accordance with the invention illustrates the surprising and unexpected progress, in particular in the improvement of the whiteness which changes from 45 to 57.

EXAMPLE 4

Example 3 is repeated but the disintegration and the first flotation are carried out at a neutral pH, in other words without adding any product likely to acidify the treated solution. The whiteness obtained after flotation is 42, and after bleaching 49.

The same second flotation in an alkaline medium is carried out. A whiteness of 55 is obtained.

EXAMPLE 5

Example 3 is repeated but, after bleaching with peroxide, the pulp is diluted to approximately 5% and treated for five minutes in a laboratory disintegrator.

The second flotation as described in Example 3 is carried out; the final whiteness of the pulp is 62.

EXAMPLE 6

Example 5 is repeated in which sodium hydrosulphite ($Na_2S_2O_4$) in a proportion of 1.5% by weight of dry substance is introduced into the mixture during the detachment in the pulper in the course of phase I. The mixture is left to stand for half an hour. The whiteness obtained after the flotation in an acid medium is 47. The final whiteness after flotation in an alkaline medium is 63.

EXAMPLE 7

Example 5 is repeated but using only newspapers printed using the offset method. A final whiteness of 64 is observed, thus representing a significant improvement inherent in the treatment in an acid medium.

EXAMPLE 8

Example 3 is repeated, replacing the acidic treatment of the first phase with an alkaline treatment at a pH close to 9.5 and using the same products as in Example 1.

The second phase is carried out at a pH close to 9.

This embodiment corresponds to that described in the document EP-A-0,116,145.

A whiteness of 40 is obtained after the first flotation, 51 after the thickening following this flotation and then 57 after the second flotation. It can therefore be seen that although the final whiteness is equal to that obtained in Example 3, on the other hand the majority of the flexographic ink is removed during the thickening phase. It follows that, when working on an industrial scale, the loop of the first phase is enriched with fine particles of ink which are recycled with the thickening water. In other words, the suspension to be treated is polluted, adversely affecting the method and consequently the quality of the pulp.

EXAMPLE 9

Example 5 is repeated, the newspapers used being printed exclusively using the flexographic method by means of water-based inks. The final whiteness obtained is 55.

The whiteness values obtained for different samples of newspapers as a function of their printing method are collated in the table below in accordance with the above examples.

|  | Offset | flexo. | flexo/offs |
|---|---|---|---|
| PRIOR ART |  |  |  |
| Example 1 | 58 | 28 | 40 |
| treatment in alkaline phase |  |  |  |
| Example 2 |  |  | 45 |
| treatment in acid phase (pH 5) |  |  |  |
| Example 8 |  |  | 57* |
| phase I: pH 9.5 |  |  |  |
| phase II: pH 9 |  |  |  |
| INVENTION |  |  |  |
| Example 3 | 60 | 55 | 57 |
| phase I: 5 < pH < 6 |  |  |  |
| phase II: pH 9 |  |  |  |
| Example 4 | 62 | 54 | 55 |
| phase I: pH neutral |  |  |  |
| phase II: pH 9 |  |  |  |
| Examples 5, 7 and 9 | 64 | 55 | 62 |
| phase I: 5 < pH < 6 + disintegrator |  |  |  |
| phase II: pH 9 |  |  |  |
| Example 6 | 65 | 57 | 63 |
| phase I: 5 < pH < 6 + $Na_2S_2O_4$ |  |  |  |
| phase II: pH 9 |  |  |  |

*but the majority of the flexographic ink is removed by thickening, and its recycling adversely affects the treatment method.

It will therefore be observed that the method described in the invention offers numerous advantages as Firstly, it can be appreciated that it makes it possible to deink paper separately and indiscriminately, irrespective of the method used to print it, in particular paper printed using the flexographic method (water-based inks), and with good whiteness qualities. Furthermore, it can be seen that it is entirely possible to deink mixtures of paper, something which it has not been possible to do effectively hitherto. Lastly, the method according to the invention promotes, and this is something unexpected, the deinking of paper printed using traditional methods, and in particular using the offset method. Thus, the method according to the invention can therefore advantageously be used for the recycling treatment of printed waste paper of widely varying origins, sorted or not sorted beforehand.

I claim:

1. In the method for de-inking printed waste paper which includes converting the paper into a pulpy suspension, separating the ink from the suspension in successive phases, and using the de-inked pulp for producing recycled paper, the steps of sequentially:
   disintegrating a quantity of waste paper in the absence of alkaline reagents, said quantity having a mixture of water-based and non-water-based printing inks, to a pulpy suspension having a pH between 4.5 and 8, and simultaneously detaching water-based inks from said pulp to yield coarse ink particles in said pulpy suspension;
   substantially removing said detached coarse ink particles from said pulpy suspension by selective flotation, leaving a remaining suspension;
   thickening said remaining suspension a first time;
   reintroducing water resulting from said step of thickening into a subsequent batch of pulpy suspension prior to said step of removing detached coarse ink particles;
   mixing said thickened remaining suspension with alkaline reagents to form a more alkaline pulpy suspension;
   detaching non-water-based inks from the pulp in said alkaline pulpy suspension;
   removing said detached non-water-based inks from the alkaline pulpy suspension leaving a remaining alkaline pulpy suspension; and
   thickening the remaining alkaline pulpy suspension, so that the de-inked pulpy suspension may be utilized in a paper-making process;
   whereby said water-based inks are removed prior to said pulpy suspension becoming more alkaline.

2. Method according to claim 1 wherein said step of disintegrating of the printed paper into said pulpy suspension takes place by disintegration in a pulper at a temperature lying between 20 and 60 degrees C.

3. Method according to claim 2, wherein surfactants and/or anti-redeposition agents are additionally added into the pulper.

4. Method according to claim 2, wherein said step of disintegrating further comprises adding sulphuric acid or carbon dioxide to an aqueous suspension of waste paper.

5. Method according to claim 2, wherein complexing agents for heavy metal ions are added into the pulper during disintegration of the paper.

6. Method according to claim 2 wherein bleaching agents which are active in an acid medium are added.

7. The method according to claim 6 wherein said bleaching agents comprise sodium hydrosulphite.

8. Method according to claim 1, wherein bleaching agents are added into said thickened remaining suspension, and a reaction mixture thus formed is stored in a storage tower for a period lying between half an hour and three hours.

9. Method according to claim 8 wherein said reaction mixture is subjected to a mechanical agitation after said mixing to form an alkaline medium.

10. The method according to claim 8, including subjecting said reaction mixture to mechanical agitation after said storage in the storage tower.

11. Method according to claim 1, wherein the step of removal of the ink from the alkaline pulpy suspension takes place by selective flotation.

12. Method according to claim 11, wherein froths resulting from the selective flotations performed during the steps of removal of ink from the pulpy suspension and the alkaline pulpy suspension are mixed after acidification of the froth from said alkaline pulpy suspension, said froths being subjected to a repeated flotation and substances recovered during the repeated flotation being recycled into the pulpy suspension.

13. Method according to claim 1 wherein the step of removal of the ink from the alkaline pulpy suspension is effected by washing.

14. The method according to claim 13 including subjecting washing water used to remove the ink to flotation to separate the ink from the water and recycling said water for use in a step subsequent to the step of ink removal by washing.

15. The method according to claim 1, wherein said step of thickening the remaining alkaline pulpy suspension comprises removing water and recycling said water for use in a step prior to said step of thickening the remaining alkaline pulpy suspension.

16. The method of claim 1, wherein said quantity of waste paper comprises an unsorted mixture comprising a first paper printed with a flexographic method and a second paper printed with a method selected from the group of offset printing, photogravure, and typography.

* * * * *